June 2, 1970 R. M. TYBURSKI ET AL 3,515,383
DOCUMENT FEEDING APPARATUS
Filed Dec. 29, 1967 4 Sheets-Sheet 3
Fig. 4
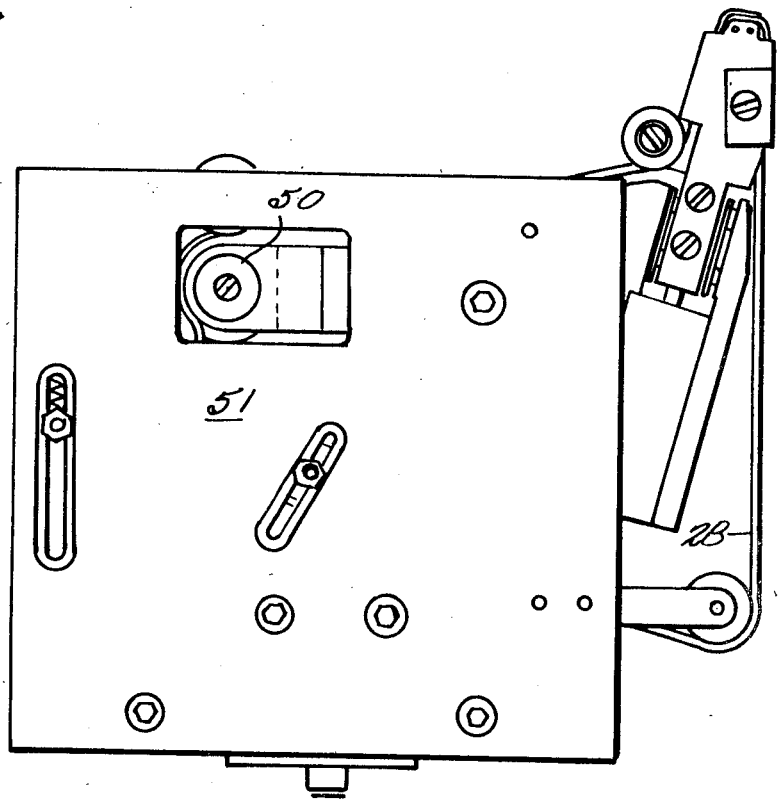
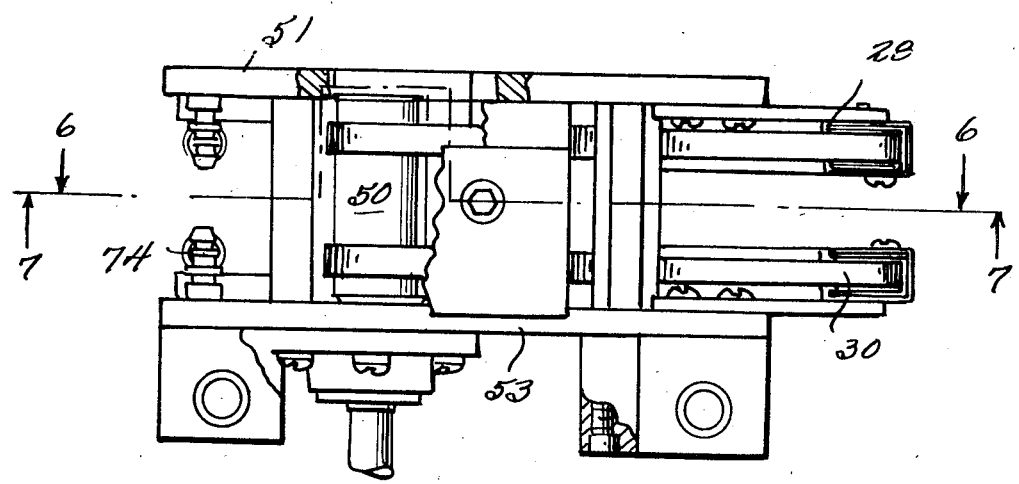
Fig. 5
INVENTORS
ROBERT M. TYBURSKI
ROBERT F. SPRINGER
BY Gerald F. Ferguson, Jr.
ATTORNEY

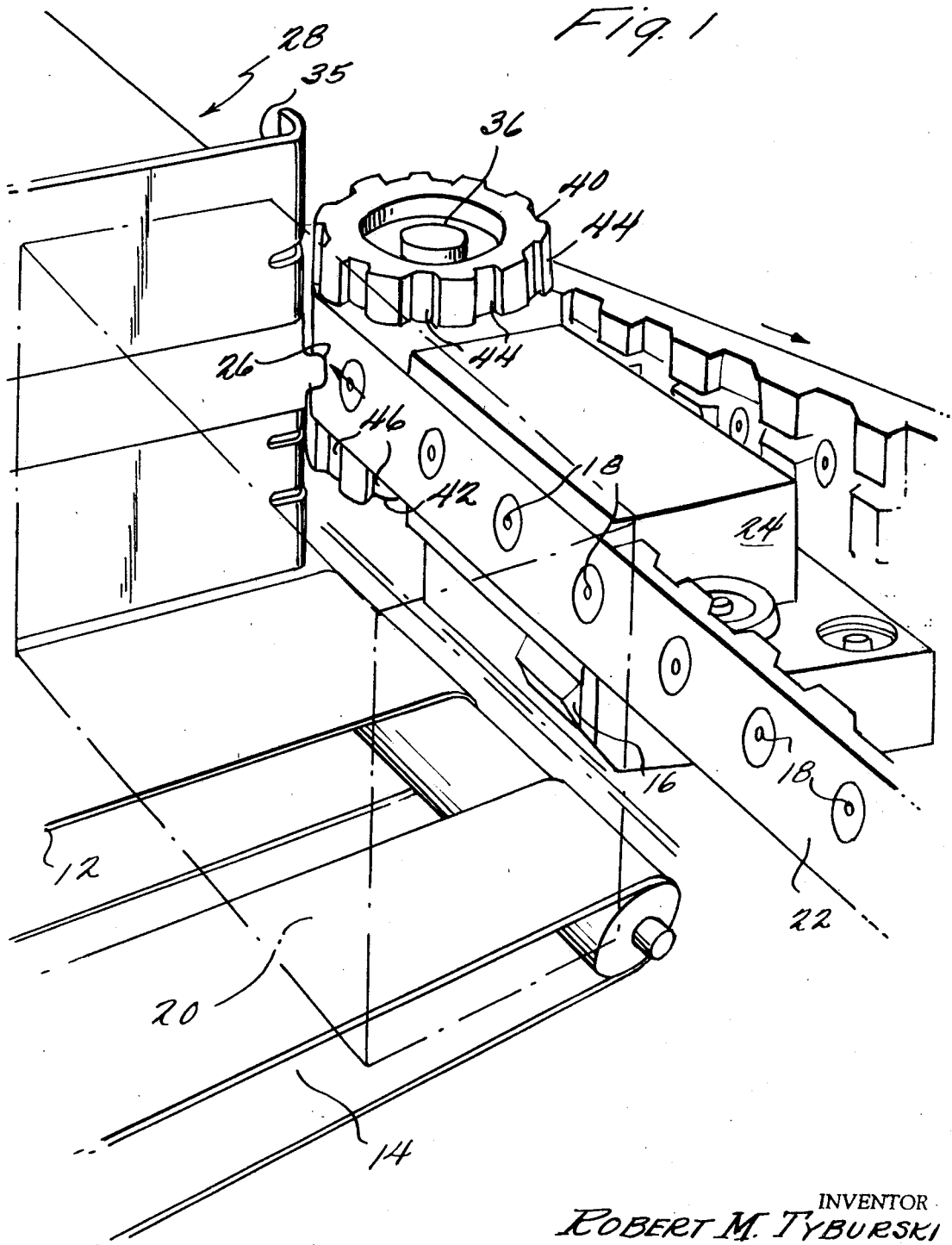

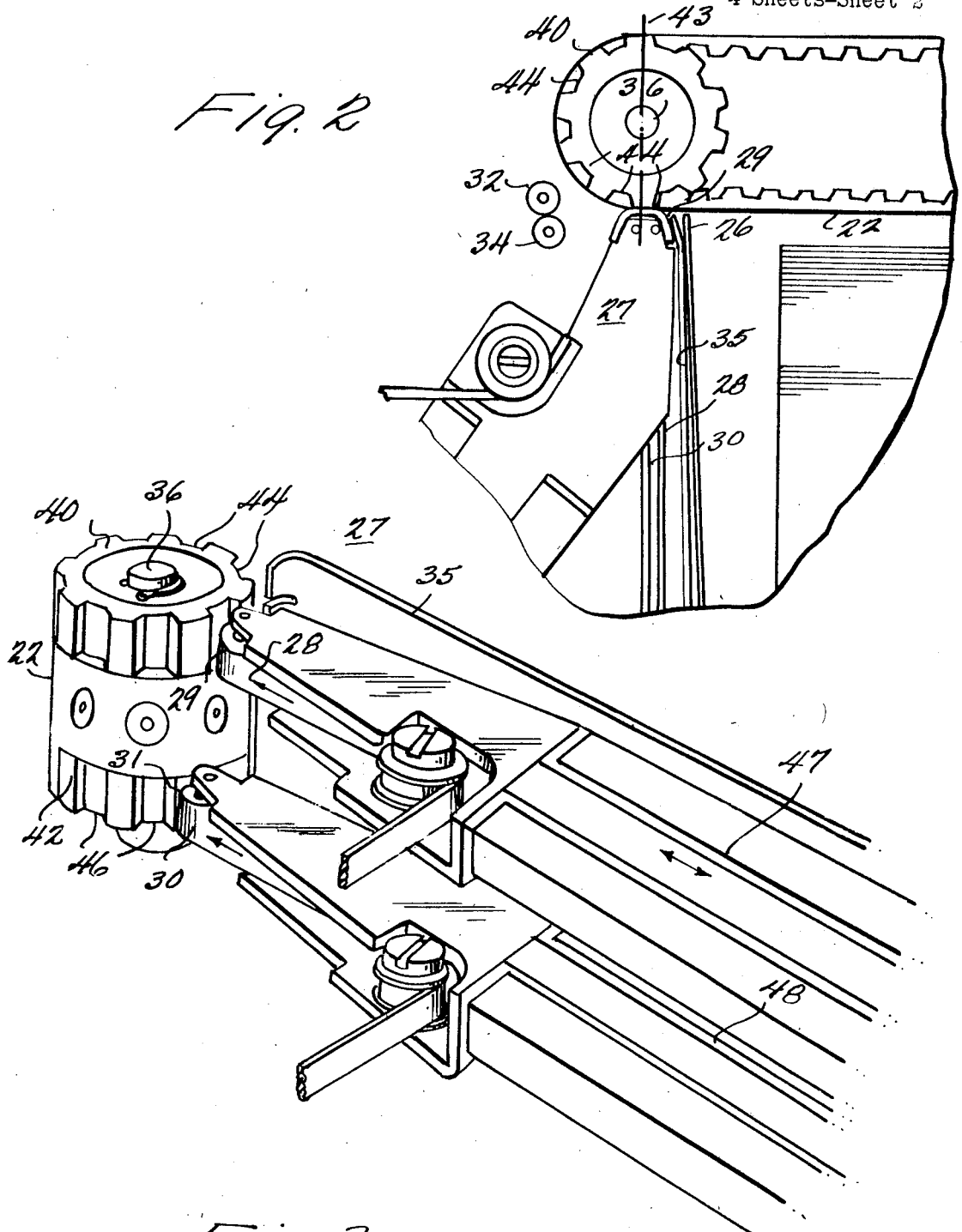

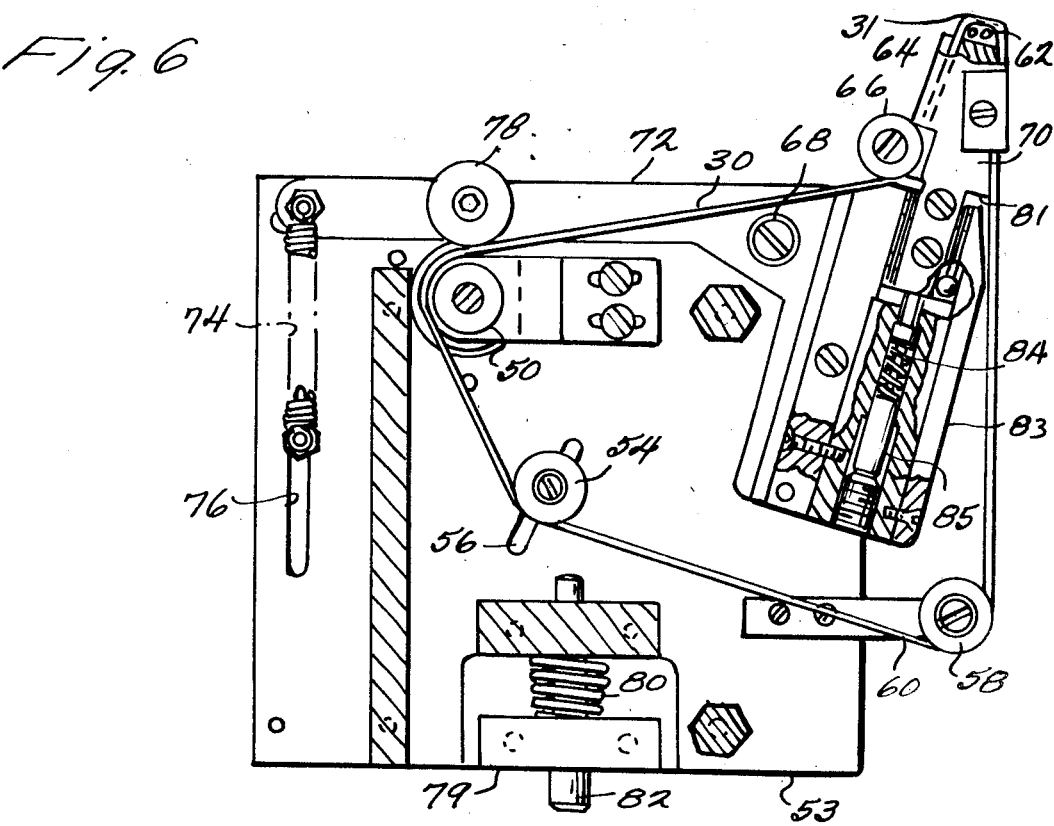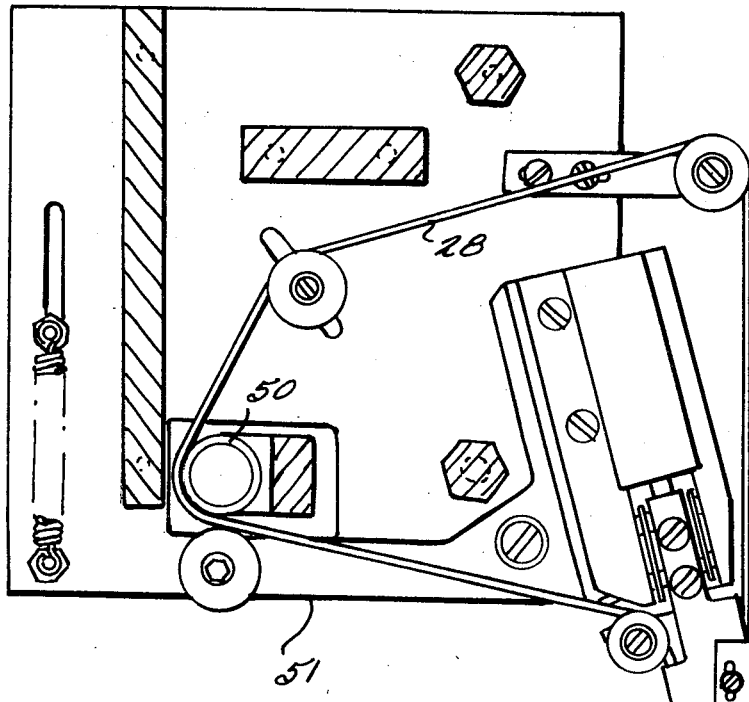

United States Patent Office 3,515,383
Patented June 2, 1970

3,515,383
DOCUMENT FEEDING APPARATUS
Robert M. Tyburski, Fairfax County, and Robert F. Springer, Prince William County, Va., assignors to Farrington Electronics, Inc., Springfield, Va., a corporation of Massachusetts
Filed Dec. 29, 1967, Ser. No. 694,683
Int. Cl. B65h 3/08, 5/08
U.S. Cl. 271—26
21 Claims

ABSTRACT OF THE DISCLOSURE

The document feeding apparatus includes a drive belt to which suction is applied to thereby attract at least one document from an input hopper. The belt is moved and the documents held to the belt are fed to a gap which permits the passage of the leading edges of typically three of the documents. To prevent a double feed of the documents, two retarding belts are positioned one after the other beyond the blade to accomplish a document separating function. The first document is fed from the drive belt into a high speed pickup device and thence into an appropriate output stack. Assuming that the edge of the three documents which pass the gap are in alignment the outermost of the three documents or the third document encounters the first of the retarding belts, the direction of rotation of which is opposite from the direction of the main belt. Thus, this first retarding belt by friction prevents the third document from being passed through the system and maintains it in the document processing station. The second document encounters the second of the retarding belts, which is disposed slightly after the first retarding belt, the second belt also rotating in a direction opposite from the direction of rotation of the drive belt. Thus, this second belt prevents the middle of the three documents or the second document from passing through the system and also maintains it in the document processing station.

BACKGROUND OF THE INVENTION

This invention relates to document feeding apparatus and, in particular, to such apparatus wherein the probability of (1) double feed failures and (2) feed failures due to deteriorated documents is substantially lessened.

In the prior art of document feed apparatus for optical character recognition apparatus, a typical approach has been to establish a gap through which only the first document (that is, the one which has just been read) is fed from the reading station. That is, the gap between a blade and a belt, against which the first card is held, is maintained at a thickness sufficient to pass only one card. However, when slightly deteriorated documents, which may be crumpled or damaged at the leading edges thereof are processed, the gap width provided for in such prior art devices is not sufficient to permit these damaged documents to pass therethrough. Thus, the throughput rate (that is, the number of documents processed over a predetermined time interval) is substantially lessened thereby affecting the efficiency of the user's operation. It has heretofore been thought necessary to provide a gap width equivalent to a single document thickness since to permit a larger gap width would result in more than one document being passed through the gap thereby increasing the possibility of double feeds, that is—the feeding of two or more documents which results in the above mentioned second and third documents not being processed by the reading circuitry.

The problem with respect to double feeds is well-known in the document feeding art. Two patents which provide means for alleviating this problem are those to R. H. Bottrell 3,035,834 and E. R. Solyst 3,027,161. Both of these patents suggest the use of a retarding belt to prevent a double feed from occurring; thus, when the belt against which the first and second documents are held moves the documents away from the input hopper, the first document is removed to an appropriate output stack; however, the second document encounters a retarding belt the direction of rotation of which is opposite from the direction of rotation of the main belt. Hence, the second document is not fed to an output stack and it is held in place in the input hopper.

As can be seen from the above discussion of the prior art, the improvements which have been made which address themselves to the double feed problem; however, a further problem is related to feed failures which typically occur when processing deteriorated documents. The problem then becomes one of reducing double feed failures while at the same time reducing feed failures.

SUMMARY OF THE INVENTION

It is thus a primary object of this invention to minimize double feed failures while at the same time minimizing feed failures.

It is a further object of this invention to provide apparatus for feeding deteriorated documents which have a wide range of thicknesses and sizes.

A further object of this invention is to minimize feed pickup failures.

A further object of this invention is to minimize double feed failures.

A further object of this invention is to minimize any misregistration between the leading edge of documents in the input hopper.

Other objects and advantages of this invention will become apparent after a reading of the following detailed description of the invention taken together with the appended claims and drawings.

A BRIEF DESCRIPTION OF THE DRAWING

FIG. 1 is a diagrammatic perspective view of an illustrative embodiment of the first retarding means portions of this invention.

FIG. 2 is a diagrammatic, top plan view of the first and second retarding means of this invention.

FIG. 3 is a diagrammatic, perspective view of an illustrative embodiment of the second retarding means of this invention.

FIG. 4 is a top plan view of an illustrative embodiment of the second retarding means.

FIG. 5 is a side view of the means of FIG. 4.

FIG. 6 is a sectional view taken along the line 6—6 of FIG. 5.

FIG. 7 is a sectional view taken along the line 7—7 of FIG. 5.

DETAILED DESCRIPTION OF A PREFERRED EMBODIMENT OF THE INVENTION

In the drawings common reference numerals are employed in all figures to denote common components of the invention.

Referring to FIG. 1 there is shown a portion of the document feed apparatus of this invention. The document feed apparatus will be described in relation to apparatus for optically reading any data which might be contained on the documents, however, it is to be understood that the feed apparatus of this invention is not limited to such an application. Documents to be read are placed on an input hopper generally indicated at 10 which includes a pair of endless conveyor belts 12 and 14 upon which the documents to be read are placed, the bottom edges of the documents resting upon the conveyor belts. A wide range of document sizes may be read, a typical range of dimensions being 1½ inches by 1½ inches to 8 inches by 6½ inches. The belts 12 and 14 carry the documents forward until they depress an input sensor 16, the documents being generally indicated at 20. Input sensor 16 detects the presence of documents 16 adjacent an endless drive belt 22 to stop conveyor belts 12 and 14. As shown in FIG. 1, belt 22 has a plurality of conical shaped holes disposed along the length thereof. Belt 22 intermittently moves and stops depending on the system operation being performed. A vacuum source 24 applies vacuum through the holes 18 disposed adjacent to the source. This vacuum draws and holds (typically, one to six) of the documents against the pickup belt 22. The number of documents held against the belt depends upon a number of factors including the thickness and overall characteristics of the documents and the strength of the vacuum applied through the holes.

The conveyor belts 12 and 14 are so disposed with respect to pickup belt 22 that the belt engages the documents 20 at the bottom portion thereof. The top portion thereof is exposed and the data thereon is read by suitable optical character recognition equipment. However, other operations may be performed on the document while it is being held against belt 22. Of course only the document immediately adjacent belt 22 can be processed. The following documents are sequentially processed after the first document has been processed. Upon completion of the reading operation for the first document, the recognition circuitry sends a control pulse to the circuitry which controls the movement of the belt 22. This circuitry then causes belt 22 to move a predetermined distance forward to thereby remove the first document from the reading station to an appropriate output stack. The second document then becomes the one immediately adjacent the belt 22. This card is then processed in the same manner as the one before it was. From this description, it is obvious that the second document cannot be fed to the output stacks until the reading or whatever operation has been performed thereon. If this does occur, then what is known as a double feed failure occurs. One of the important objects of this invention is to minimize the probability of such failures occurring. If the document adjacent drive belt 22 is crumpled, wrinkled or otherwise deteriorated especially around the leading edges thereof, there is a good probability that it will not be fed out of the system. This, in prior art systems, is due to the fact that a gap of limited width must be passed through before the document can be successfully transported from the reading station to an output stack. Thus, as stated before, an important aspect of this invention is to provide apparatus which will minimize the probability of double feed failures while at the same time increasing the probability that deteriorated documents will be fed from the reading station thereby avoiding feed failures. These requirements tend to conflict since the gap width should be minimized to prevent double feed failure while it should be maximized to increase the probability of feeding deteriorated documents.

Upon being pulsed, belt 22 moves in the direction indicated by the arrow tending to carry with it the one to six documents attracted thereto since the vacuum from source 24 is almost continuously applied through the holes 18. The leading edges of only the first three documents held against the belt 22 are permitted to pass a retarder means 26, which comprises a projecting member or blade. The gap between the retarder 26 and the belt 22 is adjustable by appropriate means not shown. It should be noted that since this gap will permit the passage of three documents, the probability of a crumpled document passing therethrough is quite good and thus the possibility of feed failures due to this problem are substantially reduced. However, since three documents are permitted to pass through the gap established by blade 26, further means generally indicated but not shown in FIG. 1 (see FIGS. 2–7) are also provided to prevent the second and third documents from being fed to the output stacks.

To further enable crumpled or otherwise deteriorated documents to pass through the gap established between blade 26 and belt 22 a special relationship is established between the blade and the truncated conical holes 18 disposed within the belt 22. The following dimensions apply to the blade and the small and large diameters of the conical holes. The large diameter circle that portion of a conical hole 18 adjacent the blade 26 typically has a diameter of ¼ inch while the diameter of the small circle or that portion of the hole 18 away from blade 26 is typically ⅛ inch. The length of blade 26 in the vertical direction is typically ⅛ inch. Further, the blade 26 is centered over the holes 18 and thus the horizontal center line thereof is in alignment with the center of the conical hole 18 where the small and large circles thereof have a common center and where the taper thereof is typically 60 degrees. Thus, typically the dimension of the blade 26 in the vertical direction is so chosen as to be approximately one-half the diameter of the large circle of conical hole 18. With the above relationships, the probability of deteriorated documents passing through the gap between the blade 26 and the belt 18 is further enhanced since they will be drawn into the holes 18 by the source 24.

Reference should now be made to FIG. 2 which diagrammatically illustrates second retarding means 27 for retarding the second and third documents which pass the blade 26. In particular retarding means 27 comprises two retarding belts 28 and 30 where belt 28 is disposed above belt 30, see FIG. 2. Both belts are disposed immediately beyond retarder 26 and rotate in a direction opposite from the direction of rotation of main drive belt 22. Thus, when the first three cards pass blade 26, the third card is retarded by the apex (indicated at 29) of belt 28 which is located immediately after retarder blade 26 if the leading edges of the three documents are in alignment. The second document will not be affected by belt 28 and thus it will be moved on by belt 22 to which vacuum is still applied by source 24. However, the presence of second retarding belt 30, the apex (indicated at 31 of FIG. 3) of which is located immediately beyond the apex of first belt 28 will prevent the second card from moving any further through the system since it also moves in a direction opposite from that of main belt 22. Of course, if there is misalignment between the leading edges of the three cards, it may be that the second card will be retarded by belt 28 and the third card by belt 30.

As can now be seen, only the first card will move through the system. A pair of high speed rollers of pickups 32 and 34 engage this card after it has been moved a sufficient distance beyond the apex of second retarding belt 30. A photo cell (not shown) disposed above and adjacent the high speed pickup rollers 32 and 34 senses that the first card has engaged the high speed pickup thereby turning off the circuitry which controls the movement of main pickup belt 22 and the vacuum supply. Thus the second card which is held in position by retarder belt 30 will be maintained at the reading station while it is optically read by the character recognition circuitry. The displacement between the apexes of the belt 28 and 30 is typically ½₂ of an inch. This allows for a maximum misregistration of typically ³⁄₁₆ inch between the leading edge of all documents in the input hopper. The high speed pickups 32 and 34 are optional and are required because the present state of the art limits the speed of belt 22 to approximately 150 inches per second (pulsed rates). However, the speed imparted to the documents by rollers 32 and 34 is typically 250 inches per second.

As shown in FIG. 2 a metal guard 35 is disposed between retarder 26 and retarding belts 28 and 30, the purpose of this guard being to prevent cards or documents from being mutilated at the edges thereof because of the movement of retarding belts 28 and 30. In FIG. 1 it can be seen that guard 35 is disposed above and below the retarder 26. The construction and operation of the retarding belts 28 and 30 will be shown hereinafter in more detail with respect to FIGS. 4 through 7.

Referring to FIG. 3, the drive shaft 36 for main pickup belt 22 has mounted thereon two rollers 40 and 42 which are vertically disposed along the shaft and respectively adjacent retarding belts 28 and 30, belt 22 being disposed between the rollers. In particular, the imaginary vertical plane 43 (see FIG. 2) passing through the shaft 36 for the rollers 40 and 42 and perpendicular to the direction of document travel lies substantially halfway between the apexes of the belts 28 and 30 and typically these apexes are each offset from this plane by about 1/64 inch.

Around the periphery of each of the rollers 40 and 42 a series of grooves are provided for further enhancing the probability that crumpled documents will pass through the system. These grooves are indicated as 44 around roller 40 and as 46 around roller 42 and are disposed in common vertical planes. Referring to FIG. 2 it can be seen that if a crumpled document passes the gap established by blade 26 together with one or more other documents, the grooves 44 and 46 will temporarily widen the passageway between the rollers 40 and 42 and the retarding belts 28 and 30 to permit passage of the deteriorated document (assuming that this document is the first document); however, the width and spacing of the grooves 44 and 46 along the periphery of the discs 40 and 42, respectively, is such as to prevent the second and third documents from also passing therethrough. The dimension of each of the grooves in the direction along the circumference of the rollers is typically 1/8 inch while the spacing between the grooves is 3/16 inch. The depth is typically 0.025 inch. Thus, an enlarged gap between the rollers 40 and 42 and the belts 28 and 30 respectively, is periodically introduced and lasts approximately five hundred microseconds which is a sufficient amount of time to permit a crumpled document to pass through while at the same time preventing the second and third document from moving away from their respective retarding belts and through the temporarily enlarged gap. It is a matter of design to determine exactly what dimensions will be most appropriate in a particular application. However, the principle of employing the grooves along the peripheries of the rollers 40 and 42 is felt to be novel and is included as an important aspect of this invention. The depth of these grooves is typically twenty-five thousandths of an inch.

Reference should now be made to FIG. 3 where there is shown a diagrammatic perspective view of the retarder assembly 27 including retarding belts 28 and 30. As can be seen in this figure, belts 28 and 30 are respectively disposed in two different horizontal planes and both of the belts are disposed beyond guard 35. Further it can be seen that the apexes of the belt 28 and 30 are movable with respect to the roller as indicated by the arrows on arms 47 and 48. The purpose of this will be explained in more detail in FIGS. 4 through 7 which will now be discussed.

Referring to FIG. 4 there is shown a top view of the second retarder means including belts 28 and 30 (not shown). In FIG. 5 a side view of this assembly is shown. Both of the belts are driven from the same shaft 50, which is also shown in FIGS. 6 and 7 where the latter two figures are sectional views taken respectively along the lines 6—6 and 7—7 of FIG. 5. The belt 28 including the respective mountings therefor is essentially the same as belt 30. In fact, a plurality of these belts can be disposed above one another if so desired. This would permit the shingle separation of more than two documents as is done in the instant embodiment of the invention. Thus, if three retarding belts were employed, the apexes thereof would be disposed one after another along the path travelled by the documents. Further, another roller corresponding to rollers 40 and 42 would have to be provided. Assuming the leading edges of the documents were aligned, the first belt would separate the document furthermost from the belt 22. The second would separate the one next to the document being fed from the reading station. It can be seen that this would permit a larger gap between the first retarder means 26 and the main belt 22. In particular, the gap could be enlarged to the point where four documents would pass therethrough, this having the inherent advantage of permitting even more severely deteriorated documents to pass through the system effectively increasing the system document throughput.

As stated above, belt 30 is substantially the same as belt 28 including the mountings therefore; thus only belt 30 will be discussed with respect to FIG. 6, it being understood that the following description will also apply to belt 28 of FIG. 7. Thus, belt 30 is mounted above the lower of two plates 51 and 53. Through plate 51 is journalled the main drive shaft 50 which in turn is driven by a motor not shown. The belts 28 and 30 are both driven by shaft 50 as can be seen in FIG. 5. Referring to FIG. 6, it is seen that the retarding belt 30 moves around an idler roller 54, the position of which is adjustable in slot 56 disposed in plate 53. The adjustability of the position of roller 54 permits appropriate tensioning within the belt 30. The belt also rotates around a fixedly positioned idler roller 58 which is mounted upon a bracket 60, which in turn is fixedly connected to plate 53 by suitable means as shown in FIG. 6. The apex portion of retarder belt 30 moves around a pair of small rollers 62 and 64. The belt comprises itself back to main drive shaft 50 via roller 66. Rollers 62, 64, and 66 are mounted on a lever assembly which is pivotally connected to plate 50 at point 68. The lever assembly consists of first lever and second lever arms 70 and 72, the apex or head portion of the retarder belt being disposed at the end of the first lever arm 70. The lever assembly serves the purpose of adjusting the gap width between the retarder belt 30 and the roller 42 (not shown in FIG. 6) to accommodate wear in the belt as it occurs. Typically, the wear can be accommodated from an initial belt thickness one-quarter of an inch to a belt thickness of a few thousandths of an inch. The second lever arm 72 has connected at the end thereof an expansion spring 74 which in turn is connected at its other end to the plate 53 through a slot 76. It can be seen in FIG. 6 that the more spring 74 is expanded, the wider the gap between the roller 42 and the apex of the retarding belt 30 will be. The preliminary setting of spring 74 corresponds to the amount of pressure required to drive belt 30. As the belt wears, its thickness of course will decrease. To insure consistent wear over the length of the belt, it is kept continuously running during machine operation. As it wears down, a roller 78 mounted upon arm 72 monitors the thickness to rotate the lever assembly around pivot point 68 to thereby maintain the gap thickness between roller 42 and retarder belt 30 constant over the life of belt 30. Since the apex of belt 30 is disposed at the end of lever arm 70, it can be seen that as the thickness of belt 30 decreases, the roller 78 will tend to move inwardly toward the shaft 50 because of spring 74 and this inward movement of lever arm 72 causes the apex of the belt 30 to move outwardly toward roller 42. The position of pivot point 68 is such that whenever roller 78 monitors a given decrease in belt 30, the apex of belt 30 is moved outwardly a corresponding amount.

In order to establish the initial gap width between the apex of belt 30 and roller 42, a compression spring 80 is provided which biases plate 53 with respect a fixed block or post 79. A belt 82 passes through a hole (not shown) in block 79 and is threaded into plate 53 or an attachment thereto to establish the initial gap width.

The initial gap width having been established, means for varying the gap width to accommodate deteriorated, wrinkled documents is provided. This includes a first portion 81 of the lever arm 70, a second portion 83 which is fixedly secured to arm 72, and compression spring 80 which biases portion 81 outwardly with respect to portion 83 as shown in FIG. 6, and a bolt 85 which determines the amount of compression in spring 80, and, in turn, determines the amount of gap width between belt 30 and roller 42 will vary as the deteriorated document passes therethrough.

Numerous modifications of the invention will become apparent to one of ordinary skill in the art upon reading the foregoing disclosure. During such a reading it will be evident that this invention has provided a unique document feeding apparatus for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims:

What is claimed is:

1. Apparatus for feeding documents from a processing station where they are subjected to a data processing operation, said apparatus comprising:
   means tending to remove a plurality of said documents from said proecssing station;
   first retarding means permitting the leading edges of at least two of said documents to be moved away from said processing station and for preventing the remaining of said plurality of documents from being fed from said station; and
   second retarding means permitting the first document in the processing station to be fed completely away from said station, for retarding the second document adjacent said first document and retaining it at said processing station, and for retarding a third document, if passed by said first retarding means, adjacent said second document and retaining it at said processing station where said second retarding means includes;
   a first retarding belt disposed adjacent the path of travel of said documents for engaging said second document to prevent movement thereof; and
   a second retarding belt disposed beyond said first retarding belt in the direction of travel of said documents for engaging said third document to prevent movement thereof.

2. Apparatus as in claim 1 where said means tending to move the documents from the processing station includes a drive belt and means for moving said drive belt including a drive shaft having at least two rollers disposed on said shaft, said rollers being respectively disposed adjacent said first and second retarding belts.

3. Apparatus as in claim 2 where said retarding belts are disposed in different horizontal planes.

4. Apparatus as in claim 3 including means for maintaining the gap width between at least one of said retarding belts and its associated roller substantially constant over the life span of said one retarding belt.

5. Apparatus as in claim 4 where said means for maintaining the gap width constant includes a lever arm assembly comprising a first lever arm and a second lever arm, the portion of said one retarding belt adjacent said associated roller being disposed at one end of said first lever arm and sensing means mounted on the second lever arms for engaging said one retarding belt whereby any decrease in said one retarding belt is sensed by said sensing means to rotate said lever arm assembly and thereby compensate for the said wear in the belt by maintaining the gap width constant between said one belt and its associated roller.

6. Apparatus as in claim 2 wherein said rollers each include a plurality of grooves disposed around the peripheries thereof, said grooves permitting passage of deteriorated documents between the rollers and the retarding belts for a momentary period of time depending on the length of the groove along the periphery of the rollers whereby said deteriorated documents disposed adjacent the drive belt will be passed while those removed from the belt will be held by the retarding belts.

7. Apparatus as in claim 6 including means for adjusting the gap width between said one retarding belt and its associated roller so that said gap width varies as a deteriorated document passes between the said one retarding belt and its associated roller.

8. Apparatus as in claim 7 where said means for adjusting the gap width includes a first portion of the first lever arm disposed adjacent the gap between said one retarding belt and its associated roller, a second portion of the first lever arm fixedly disposed with respect to said second lever arm, and spring means connecting said first and second portions, said spring means being sensitive to deteriorated documents to move the first portion of the first lever arm in accordance with the condition of the document passing through the gap.

9. Apparatus as in claim 2 where the vertical plane passing through said two rollers perpendicular to the direction of travel of said documents is disposed approximately halfway between the apexes said two retarding belts.

10. Apparatus as in claim 9 where the apexes said retarding belts are disposed approximately $1/32$ of an inch apart along the direction of travel of the documents.

11. Apparatus for feeding documents from a processing station where they are subjected to a plurality of sequential data processing operations, said apparatus comprising
   a drive belt having a plurality of holes disposed along the length thereof;
   means for moving said belt upon the completion of each of said data processing operations;
   means for applying a vacuum through said holes in the belts to hold a plurality of the documents adjacent the belt whereby a plurality of documents tend to be moved from said processing station when said drive belt is moved;
   first retarding means for establishing a gap between said retarding means and said belt whereby the leading edges of at least two of said documents held to the belt pass through said gap and the remaining of said plurality of documents are prevented from passing through said gap;
   a first retarding belt disposed beyond said first retarding means in the direction of travel of the documents along the drive belt;
   a second retarding belt disposed beyond said first retarding belt in the direction of travel of the documents along the drive belt; and
   means for moving said first and second retarding belts in a direction opposite from the direction of said main drive belt;
   whereby the first document immediately adjacent the drive belt is completely fed away from said processing station, the second document adjacent said first document is retained at said processing station by one of said retarding belts and a third document, if passed by said first retarding means, adjacent said second document is retained at said processing station by the other of said retarding belts.

12. Apparatus as in claim 11 where said means for moving the drive belt includes a shaft having at least two rollers mounted on said shaft and respectively disposed adjacent said first and second retarding belts, said retarding belts being respectively disposed in two different horizontal planes.

13. Apparatus as in claim 12 including means for adjusting the gap width between at least one of said retarding belts and its associated roller to compensate for wear of said one retarding belt.

14. Apparatus as in claim 13 where said means for adjusting the gap width between said one retarding belt and its associated roller comprises a lever arm assembly having first and second lever arms, a portion of said one retarding belt being disposed at one end of the first lever arm and adjacent its associated roller, means mounted one the second lever arm for monitoring the retarding belt thickness, and means biasing said lever arm assembly so that said assembly is rotated so as to maintain the gap width between said one retarding belt and its associated roller effectively constant over the life span of said one belt.

15. Apparatus as in claim 12 including means for varying the gap width between at least one of said retarding belts and its associated roller so as to increase the probability of deteriorated documents passing through the last mentioned gap.

16. Apparatus as in claim 15 where said gap width varying means includes a first portion of the first lever arm disposed adjacent the gap between said one retarding belt and its associated roller, a second portion of the first lever am fixedly disposed with respect to said second lever arm, and spring means connecting said first and second portions, said spring means being sensitive to deteriorated documents to move the first portion of the first lever arm in accordance with the conditions of the document passing through the gap.

17. Apparatus as in claim 12 where each of said rollers have disposed around the periphery thereof a plurality of grooves, the length of said grooves along the periphery and the spacing between said grooves being such that deteriorated documents immediately adjacent the drive belt are passed through the gaps between said retarding belts and their associated rollers.

18. Apparatus as in claim 11 where said first retarding means comprises a projecting blade and where the holes in said drive belt have the shape of truncated cones, the largest diameter of the truncated conical holes being disposed adjacent said projecting member.

19. Apparatus as in claim 18 where the height of said projecting member is approximately one-half the diameter of said largest diameter of the truncated conical holes in the drive belt whereby the probability of passing deteriorated documents through the gap between said projecting blade and said main drive belt is increased.

20. Apparatus as in claim 12 where the vertical plane passing through said rollers perpendicular to the direction of travel of said documents is disposed approximately halfway between said first and second retarding belts.

21. Apparatus as in claim 12 where said means for moving said first and second retarding belts includes at least one idler roller so disposed with respect to the gap between one of said retarding belts and its associated roller that the retarding belt forms and angle at that gap, the apex of which is disposed immediately adjacent said gap.

References Cited

UNITED STATES PATENTS

| | | | |
|---|---|---|---|
| 2,905,309 | 9/1959 | Makrides | 271—12 X |
| 3,198,514 | 8/1965 | Barbera | 271—12 |
| 3,260,520 | 7/1966 | Sugden | 271—26 |

EDWARD A. SROKA, Primary Examiner

U.S. Cl. X.R.

271—31, 11